United States Patent [19]
Imai et al.
[11] Patent Number: 5,001,501
[45] Date of Patent: Mar. 19, 1991

[54] IMAGE FORMING APPARATUS

[75] Inventors: Nobuhiro Imai, Kawasaki; Tadashi Ochiai, Mitsukaido, both of Japan

[73] Assignee: Canon Kabushiki Kaisha, Tokyo, Japan

[21] Appl. No.: 401,243

[22] Filed: Aug. 31, 1989

[30] Foreign Application Priority Data

Sep. 1, 1988 [JP] Japan ........ 63-216323

[51] Int. Cl.⁵ ........ G01D 15/06
[52] U.S. Cl. ........ 346/160.1
[58] Field of Search ........ 346/153.1, 160.1

[56] References Cited

U.S. PATENT DOCUMENTS 3,204,247 8/1965 Barnes ........ 346/160.1

*Primary Examiner*—Donald A. Griffin
*Attorney, Agent, or Firm*—Fitzpatrick, Cella, Harper & Scinto

[57] ABSTRACT

The present invention provides an image forming apparatus comprising recording electrodes to which voltage for recording is applied, a sheet-shaped recording medium arranged in confronting relation to the recording electrodes, a driving source for driving the recording medium, a toner accommodating container arranged transversely to a direction to which the recording medium is moved, toner conveying means to supplying toner between the recording electrodes and the recording medium, and power source means for driving the image forming apparatus. In the image forming apparatus, the power source means is arranged below the toner accommodating container to obtain a high quality image.

8 Claims, 5 Drawing Sheets

IMAGE FORMING APPARATUS

BACKGROUND OF THE INVENTION

1. Field of the Invention

The present invention relates to an image forming apparatus such as a recording device, displaying device and the like, wherein an image is formed on a recording medium by electrostatically adhering developer to the recording medium.

2. Related Background Art

Nowadays, various image forming apparatuses in which an image is formed in accordance with image information have been developed and proposed. Some of them utilize powder developer such as toner to form the image by adhering the toner to a recording medium electrostatically.

For example, in a conventional copying machine, the charged photosensitive drum is selectively exposed in accordance with the image information, and the toner is electrostatically adhered to the exposed portion on the drum, thus forming the image.

Recently, as disclosed in the U.S. Pat. No. 3,914,771, toner conveyed by a rotatable magnet is selectively charged by recording electrodes and the charged tone adheres to a recording medium to form an image thereon.

In comparison with the so-called thermal recording technique, such a technique that the toner is electrostatically adhered to the recording medium to form the image thereon has advantages that the recording speed is faster and that the image formed on the photosensitive drum or on the recording medium can be more easily erased and the image can be repeatedly formed.

However, when the toner is wet, the charging ability of the toner is worsened and the fluidity of the toner is reduced, thus often having bad influences upon the image formation.

To avoid this, a technique of providing heating elements to dry the toner contained in a toner container has been proposed; however, this technique has drawback that the whole apparatus is complicated and the number of parts is increased, which makes the apparatus expensive.

SUMMARY OF THE INVENTION

An object of the present invention is to provide an image forming apparatus which can eliminate the above-mentioned conventional drawbacks and can maintain the developer in a dried condition without the provision of any special heating elements.

The above object is achieved by providing an image forming apparatus according to the present invention, which comprises a plurality of recording electrodes to each of which voltage for recording is applied, a recording medium arranged in confronting relation to the recording electrodes, a drive source for driving the recording medium, a toner accommodating container arranged transversely to a direction to which the recording medium is moved, a toner conveying means for supplying toner between the recording electrodes and the recording medium, and a power source arranged below the toner accommodating container, for driving the apparatus.

DESCRIPTION OF THE PREFERRED EMBODIMENT

The present invention will now be explained with reference to the accompanying drawings.

Figure 1:
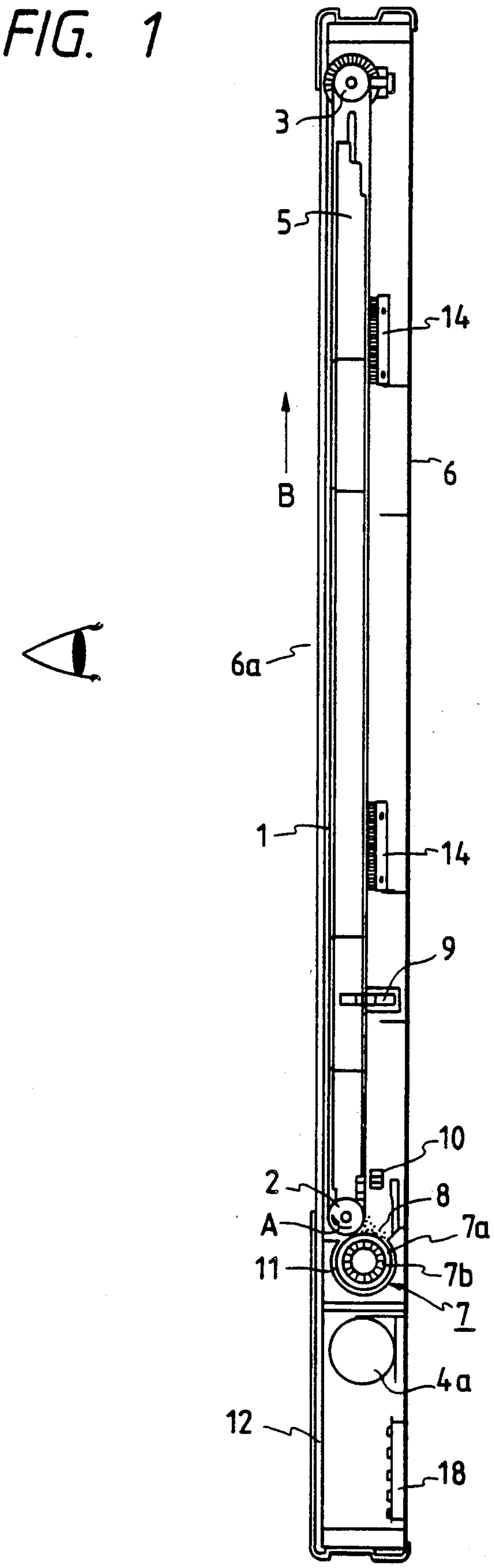
FIG. 1 is a sectional view of an image forming apparatus according to a preferred embodiment of the present invention.
Figure 2:
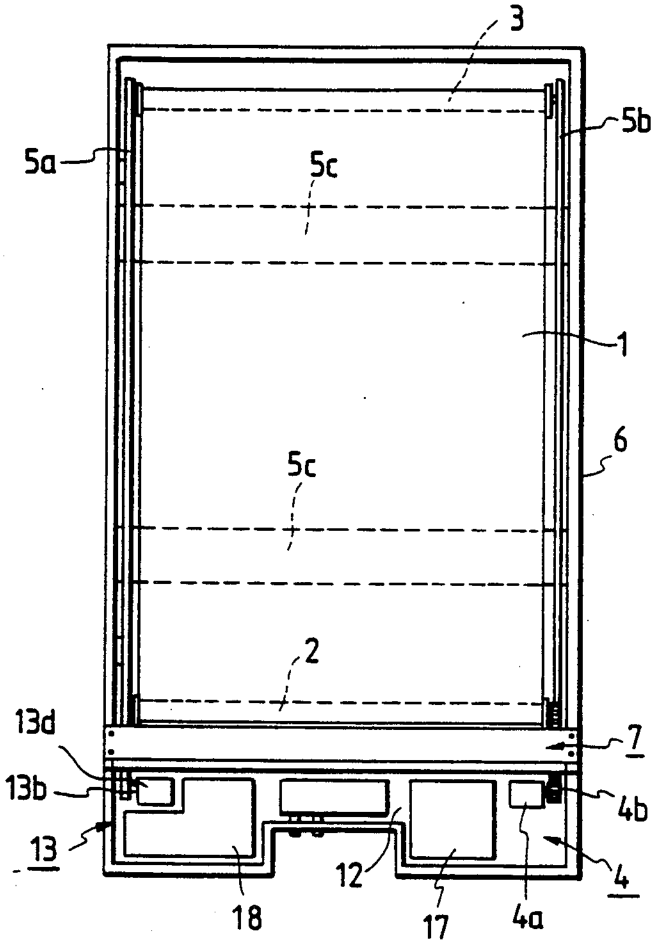
FIG. 2 is a schematic elevational view of the apparatus of FIG. 1.

First of all, with reference to FIG. 1 showing a sectional view of an image forming apparatus according to the present invention and FIG. 2 showing a schematic elevational view of the apparatus, the whole construction of the image forming apparatus will be briefly explained. The reference numeral 1 designates a recording sheet of endless belt type constituting a recording medium, which extends between a driving roller 2 and a driven roller 3 and is supported by them. When the driving roller 2 is rotated by a drive means 4 in a direction shown by the arrow A, the recording sheet 1 is turned toward a direction shown by the arrow B. The driving roller 2 and driven roller 3 are supported by a support frame 5 which is attached to a body frame 6 of the apparatus having a display window 6*a*.

Further, a developing means 7 for forming the image on the recording sheet 1 is arranged below the driving roller 2, which developing means 7 serves to charge conductive and magnetic fine powder developer (referred to as "toner" hereinafter) 8 in accordance with image information and to attach or adhere the charged toner 8 to the recording sheet 1 thereby forming the image thereon. A home position of the recording sheet 1 being turned in the direction B is detected by a home position sensor 9, and the image formed on the recording sheet (by the developing means 7) is displayed or indicated through the display window 6*a* at the home position.

After passing through the display window 6*a*, the image formed on the recording sheet 1 reaches a cleaning means 10 as the recording sheet 1 continues to turn toward the direction B, where the toner 8 adhered to the recording sheet 1 is removed from the sheet by means of the cleaning means 10. The removed toner is returned to a toner accommodating container 11.

Incidentally, in FIG. 1, the reference numeral 14 designates conductive brushes contacting with an outer layer of the recording sheet 1.

Next, the construction of each constructural elements will be fully explained.

The recording sheet 1 has a two-layer construction (not shown) including an outer insulating layer positioned outside a turning path of the recording sheet and an inner conductive layer positioned inside the turning path, and has substantially the same width as that of the display window 6*a*. As shown is FIG. 2, the recording sheet 1 is supported by the driving and driven rollers 2 and 3 which are supported by longitudinal frames 5*a*, 5*b* and cross frames 5*c*. The drive roller 2 is connected to the drive means 4.

Figure 3:
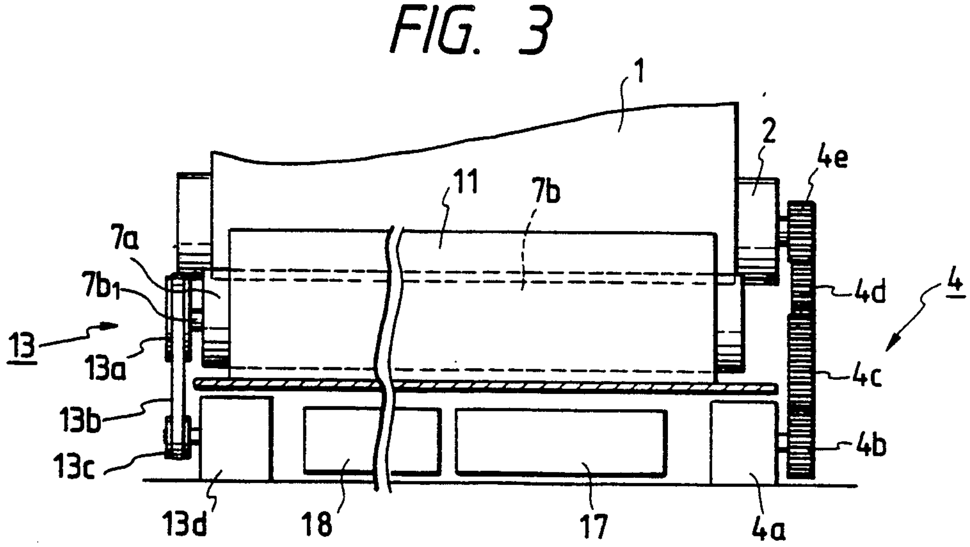
FIG. 3 is a partial broken view showing a mechanism for driving a recording medium and a rotatable magnet.

As shown in FIG. 3, the drive means 4 comprises a roller driving motor 4*a* arranged in an electric station 12 (FIGS. 1, 2) positioned below the developing means 7, a motor gear 4*b* fixed to a shaft of the motor 4*a*, idler gears 4*c*, 4*d*, and a roller gear 4*e* fixed to the driving roller 2, these gears 4*b*–4*e* being meshed with each other in order. In this way, the driving force of the driving motor 4*a* is transmitted to the driving roller 2 to rotate the latter.

Next, the developing means 7 includes a developer conveying means for conveying the toner 8, comprising non-magnetic cylindrical member 7*a* and a rotatable magnet 7*b*, and an electrode plate 7*c* having a plurality of recording electrodes arranged along a transverse direction of the recording sheet 1, by which the toner 8 is charged in accordance with the image information, thereby adhering the charged toner 8 to the recording sheet to form the image thereon.

More particularly, in the developer conveying means, the non-magnetic cylindrical member 7*a* is arranged within the toner accommodating container 11 and the rotatable magnet 7*b* is rotatably positioned within the cylindrical member 7*a*. The cylindrical member 7*a* is supported, at its both ends, by the body frame 6, and the rotatable magnet 7*b* is rotatably supported by the body frame 6 through an end shaft $7b_1$ of the magnet.

Further, the rotatable magnet 7*b* is connected to a drive means 13. More particularly, as shown in FIG. 3, a pulley 13*a* is fixedly mounted on the end shaft $7b_1$ of the rotatable magnet 7*b*, which pulley 13*a* is connected, through a timing belt 13*b* and a motor pulley 13*c*, to a magnet driving motor 13*d* positioned in the electric station 12.

Figure 4:
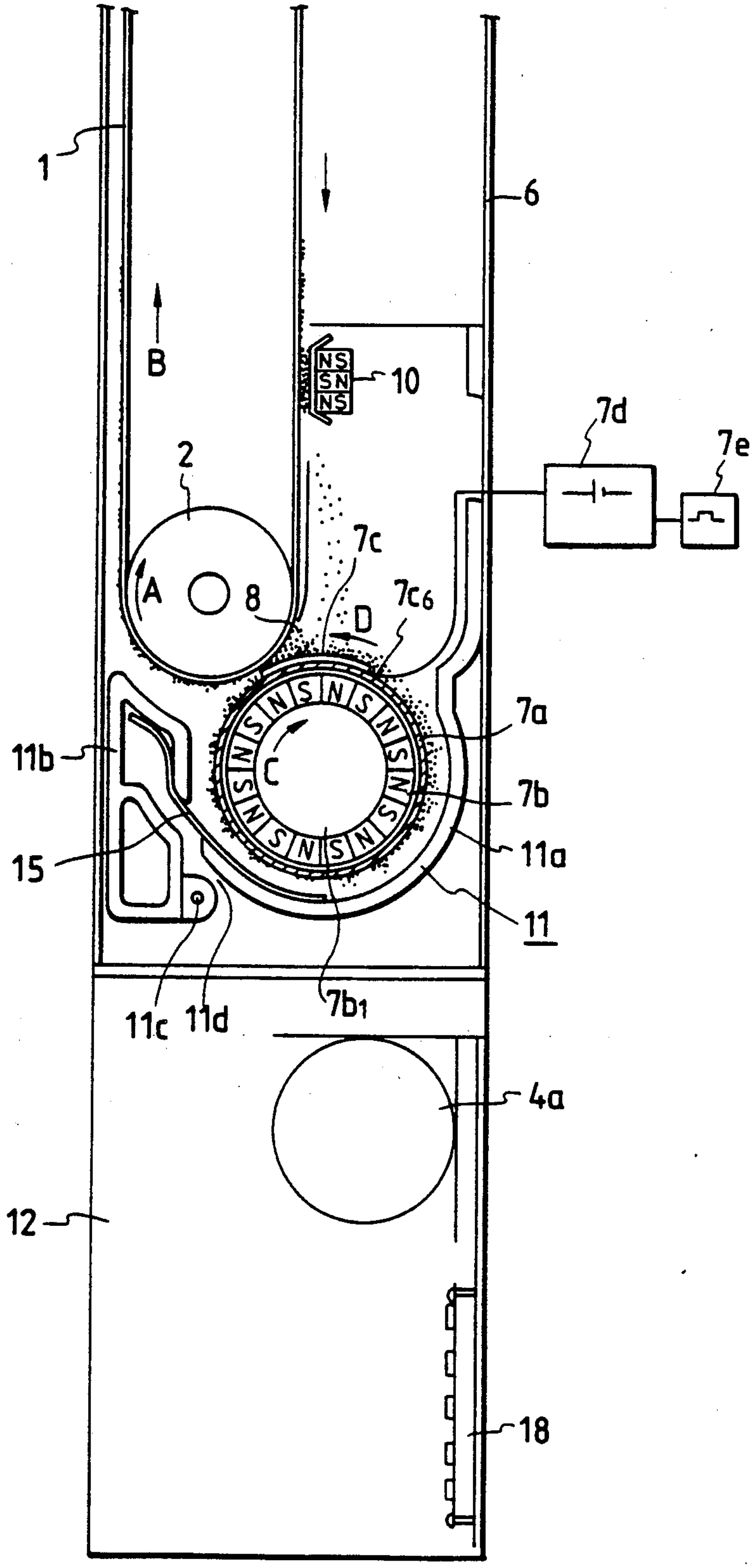
FIG. 4 is a view for explaining a developing means.

Accordingly, when the motor 13*d* is energized, the rotatable magnet 7*b* is rotated in a direction shown by the arrow C in FIG. 4, thereby conveying the toner 8 in the container 11 in a direction shown by the arrow D along an outer surface of the cylindrical member 7*a*.

Figure 5A:
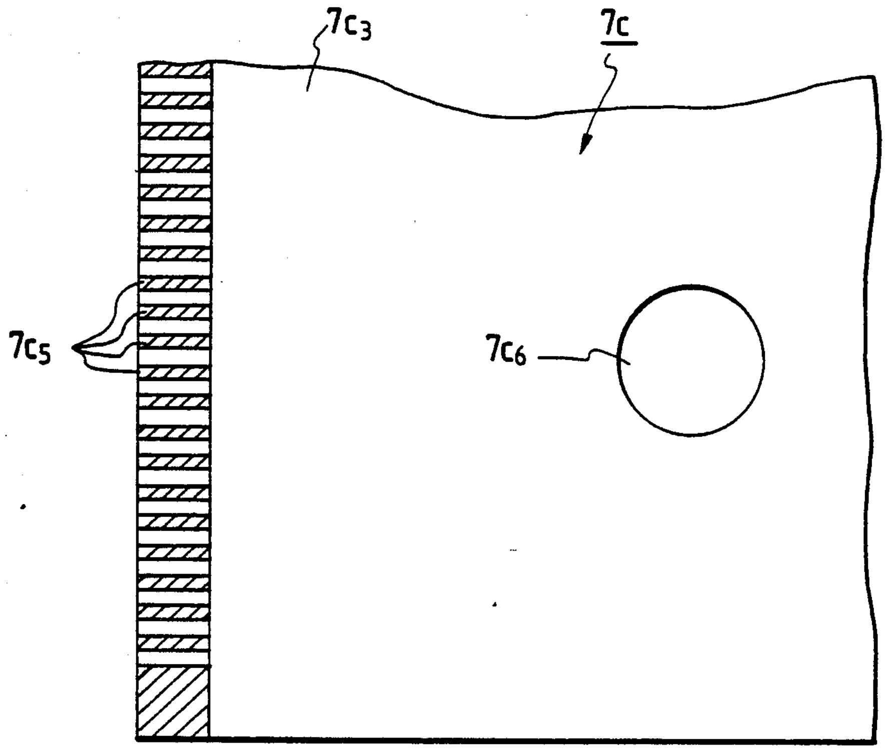
FIG. 5A is a partial plan view of a recording electrode plate.
Figure 5B:
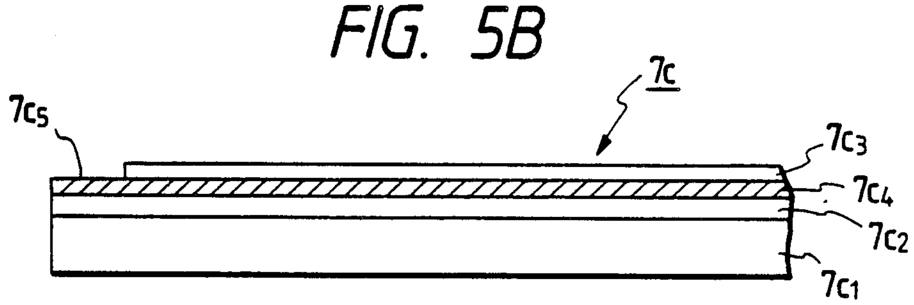
FIG. 5B is a partial side view of the recording electrode plate.

The recording electrode plate 7*c* is arranged on the outer surface of the cylindrical member 7*a* in such a manner that the recording electrodes $7c_5$ are opposed to the recording sheet 1. As shown in FIGS. 5A and 5B, the recording electrode plate 7*c* comprises a support member $7c_1$ made of non-magnetic material such as aluminium, and a flexible circuit board adhered to the support member $7c_1$ and having substantially the same width as that of the recording sheet 1. The circuit board comprises a base film $7c_2$ and a cover film $7c_3$, which may be made of polyamide material and the like, and a plurality of electrode members $7c_4$ interposed between the base film and the cover film. Terminal ends of the electrode members $7c_4$ are exposed from the cover film $7c_3$ to constitute the recording electrodes $7c_5$. The recording electrodes $7c_5$ are arranged in confronting relation to the recording sheet 1 with a small gap of the order of 300 $\mu$m or less therebetween.

Further, a plurality of toner passing holes $7c_6$ are formed and the recording electrode plate 7*c* in aligned with each other along the width of the recording sheet 1, whereby the toner 8 fed along the outer surface of the cylindrical member 7*a* can be conveyed onto the recording electrodes $7c_5$ through these holes $7c_6$.

In addition, the electrode members $7c_4$ are connected to a recording controller 7*d* and an image inputting device 7*e* such as an image scanner, computer or the like.

With the image recording apparatus having the above construction, when the voltage is applied to the recording electrodes $7c_5$ selectively, the charges are supplied to the toner 8 situated on the energized recording electrodes $7c_5$. When the charged toner 8 contacts the recording sheet 1 having the outer insulating layer, the charge having the polarity opposite to that of the charge of the toner is induced on the conductive layer of the recording sheet 1, whereby the charged toner 8 is attached or adhered to the recording sheet 1 to form the image thereon.

On the other hand, the toner 8 situated on the recording electrodes $7c_5$ which have not been energized (useless toner) is removed from the recording sheet 1 by the conveying force of the rotatable magnet 7*b* and is subsequently fed along the surface of the cylindrical member 7*a*. In this way, the image is formed on the recording sheet 1 by applying the voltage according to the image information to the recording electrodes $7c_5$ from the inputting device 7*e*.

The cleaning means 10 is arranged downstream of the turning direction of the recording sheet 1 with respect to the developing means 7. In the illustrated embodiment, the cleaning means comprises a magnet 10 spaced from the recording sheet 1 by a predetermined distance. In this way, as shown in FIG. 4, the toner 8 adhered to the recording sheet 1 is attracted by the magnet 10 at the cleaning station. The attracted toner remains on the magnet to form a so-called toner brush. Thus, the toner image formed on the recording sheet 1 is erased and removed by the toner brush, and the excessive removed toner drops in the lower toner container 11 and is used again.

Figure 6:
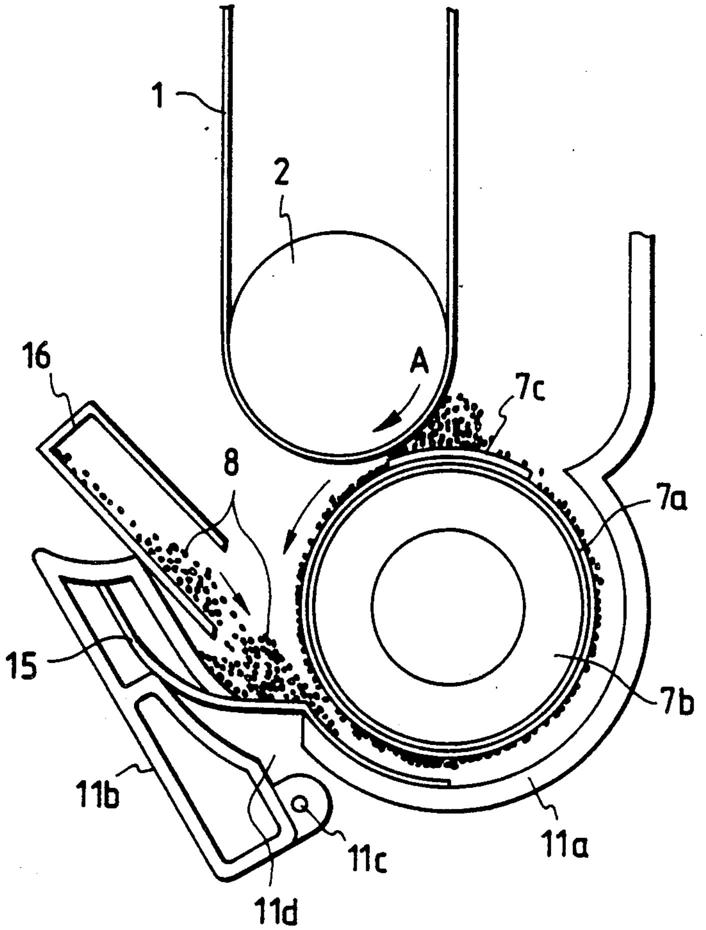
FIG. 6 is a sectional view for explaining an operation for replenishing toner into a toner accommodating container.

As mentioned above, the toner 8 in the toner accommodating container 11 can be used repeatedly. As shown in FIG. 6, the toner container 11 is so designed that it can be opened to facilitate the introduction of the toner 8 therein 11 before the use of the image forming apparatus. That is to say, the toner accommodating container 11 comprises a container body 11*a* arranged to surround the cylindrical member 7*a*, and a cover member 11*b* mounted on the container body for opening and closing movement around a pivot pin 11*c*. Incidentally, although not shown in the drawing, a stopper is provided for regulating an angle of rotation of the cover member 11*b* when the cover member is opened. Further, a locking hook (not shown) is also provided for locking the cover member 11*b* to the container body 11*a* for maintaining the closed condition when the cover member 11*b* is closed. The stopper and locking hook may have any conventional construction.

Further, a sealing member 15 is provided at a junction between the container body 11*a* and the cover member 11*b*. In the illustrated embodiment, the sealing member comprises a single Myler sheet 15 extending across the whole longitudinal length of the toner container 11 at the junction. The end of the sheet member 15 arranged between the container body 11*a* and the cover member 11*b* is inserted into an upper laid U-shaped bent portion of the cover member 11*b*, as shown in FIGS. 4 and 6.

Since the toner accommodating container 11 is constructed as mentioned above, when it is desired that the toner 8 is introduced into the toner container 11, the cover member 11*b* is opened to release the upper portion of the toner container 11 as shown in FIG. 6. Then, the toner 8 can be easily replenished from a toner replenishing container 16 into the toner container 11.

Although there is a gap 11*d* between the container body 11*a* and the cover member 11*b*, since this gap is sealed by the flexible sealing sheet member 15, the toner 8 replenished into the toner container 11 can effectively be prevented from escaping out of the toner container through the gap 11*d*.

Next, the relation between the toner container 11 and the drive means 4, 13 will be explained. As shown in FIGS. 2 to 4, the motor 4*a* for rotating the driving roller 2 and the motor 13*d* for rotating the rotatable magnet 7*b* are arranged within the electric station 12 positioned below the toner container 11. And, a power source 17 for energizing these motors 4*a*, 13*d* and a wiring substrate 18 therefor are also arranged within the electric station 12.

With this arrangement, the toner 8 in the toner container 11 can always be kept in a dried condition. That is to say, the motors 4*a*, 13*d*, power source 17 and wiring substrate 18 generate the heat when they are driven, which heat can heat the toner container 11 through the metallic body frame 6. Therefore, the temperature in the toner container 11 is increased higher than the room temperature (for example, by 10° C.) without using any special heating elements, thus always keeping the toner and air in the toner container 11 in the dried condition. In this way, then the image is formed by the developing means 7, the charging ability of the toner 8 becomes stable, thus obtaining the high quality image.

Incidentally, in addition to the above-mentioned construction, if a plurality of through holes (not shown) are formed in the body frame 6 situated between the electrical station 12 and the toner container 11, the heat energy generated in the electrical station 12 will more effectively be transmitted to the toner container 11 through such through holes.

While in the illustrated embodiment an example that the image is formed on the recording sheet of the turnable endless belt type was explained, a recording sheet comprised of a belt having a limited length on which the image is formed may be used.

According to the present invention, since the drive means for driving the recording medium and the power source therefor are arranged below the developer accommodating container, the heat generated from the driving means and power source can effectively be transmitted to the developer accommodating container, thereby always drying the developer in the container. Accordingly, even if any special heating elements are not provided for drying the developer, the charging ability of the developer is maintained in good condition, thus always obtaining the high quality image.

We claim:

1. An image forming apparatus comprising:
recording electrodes to which voltage for recording is applied;
a recording medium arranged in confronting relation to said recording electrodes;
a driving source for driving said recording medium;
a toner accommodating container arranged transversely to a direction to which said recording medium is moved;
toner conveying means for supplying toner between said recording electrodes and said recording medium; and
power source means for driving the image forming apparatus; wherein said power source means is arranged below said toner accommodating container.

2. An image forming apparatus comprising:
recording electrodes to which voltage for recording is applied;
a recording medium arranged in confronting relation to said recording electrodes;
a driving source for driving said recording medium;
a toner accommodating container arranged transversely to a direction to which said recording medium is moved;
toner conveying means for supplying toner between said recording electrodes and said recording medium; and
power source means for driving the image forming apparatus; wherein said driving source and said power source means are arranged below said toner accommodating container.

3. An image forming apparatus according to claim 2, wherein electric means for energizing said recording electrodes is provided below said toner accommodating container, together with said driving source and said power source means.

4. An image forming apparatus comprising:
recording electrodes to which voltage for recording is applied;
a recording medium arranged in confronting relation to said recording electrodes and movable in an up-and-down direction;
a driving source for driving said recording medium;
a magnetic toner accommodating container arranged transversely to a direction to which said recording medium is moved;
toner conveying means for supplying magnetic toner between said recording electrodes and said recording medium by means of a magnetic force;
power source means for driving the image forming apparatus, wherein said driving source and said power means are arranged below said toner accommodating container, and
a frame for housing said recording electrode, said recording medium, said driving source, said toner container, said toner conveying means and said power source means.

5. An image forming apparatus according to claim 4, wherein an optical opening is formed in said frame to indicate an image recording on said recording medium.

6. An image forming apparatus according to claim 4, wherein electric means for energizing said recording electrodes is provided below said toner accommodating container, together with said driving source and said power source means.

7. An image forming apparatus according to claim 4, wherein said recording medium is formed as a belt shape, and said belt shaped recording medium is rotatably supported, at its upper and lower portions, by rotary members, and further a width of said driving source is substantially the same as a shorter width of said magnetic toner accommodating container.

8. An image forming apparatus comprising:
electrodes to which voltage for recording is applied;
electric means for energizing said recording electrodes;
a recording medium movable in an up-and-down direction;
a driving source for driving said recording medium;

a magnetic toner accommodating container arranged transversely to a direction to which said recording medium is moved;

toner conveying means for supplying magnetic toner between said recording electrodes and said recording medium by means of a magnetic force;

a body frame having an optical opening for indicating a toner image recorded on said recording medium; and power source means for driving the image forming apparatus; wherein said electric means for energizing said recording electrodes is arranged below said toner accommodating container, together with said driving source and said power source means.

* * * * *

UNITED STATES PATENT AND TRADEMARK OFFICE

CERTIFICATE OF CORRECTION

PATENT NO. : 5,001,501

DATED : March 19, 1991

INVENTOR(S) : Nobuhiro Imai, et al.

It is certified that error appears in the above-identified patent and that said Letters Patent is hereby corrected as shown below:

COLUMN 1:

Line 27, "charged tone" should read --charged toner--.

Signed and Sealed this

Ninth Day of November, 1993

Attest:

Bruce Lehman

BRUCE LEHMAN

Attesting Officer

*Commissioner of Patents and Trademarks*